United States Patent [19]

Heurich et al.

[11] 4,125,298
[45] Nov. 14, 1978

[54] ASSEMBLY OF HARDENED AND DEFORMABLE METAL PARTS

[75] Inventors: Günther Heurich; Heinrich Hofmann, both of Schweinfurt, Fed. Rep. of Germany

[73] Assignee: Kugelfischer Georg Schäfer & Co., Schweinfurt, Fed. Rep. of Germany

[21] Appl. No.: 778,463

[22] Filed: Mar. 17, 1977

[30] Foreign Application Priority Data

Mar. 17, 1976 [DE] Fed. Rep. of Germany ....... 2611218

[51] Int. Cl.$^2$ ...................... F16C 13/00; F16C 33/00; F16C 35/00

[52] U.S. Cl. ................................ 308/189 R; 308/236; 308/207 R; 29/148.4 B; 29/520; 29/522 R; 403/274; 403/285; 29/148.4 A

[58] Field of Search ..................... 29/520, 522, 148.4 B, 29/148.4 A; 403/274, 285; 308/15, 16, 21, 22, 24, 189 R, 236, 207 R, 18, 208

[56] References Cited

U.S. PATENT DOCUMENTS

| | | | |
|---|---|---|---|
| 1,067,362 | 7/1913 | Miller | 29/520 X |
| 1,537,828 | 5/1925 | Jones | 29/522 UX |
| 1,903,776 | 4/1933 | Clark et al. | 308/236 X |
| 2,025,223 | 12/1935 | Watson | 29/520 UX |
| 2,537,723 | 1/1951 | Ward | 29/520 UX |
| 2,546,801 | 3/1951 | Visone | 308/15 |
| 2,644,350 | 7/1953 | Regimbald | 29/520 UX |
| 2,840,113 | 6/1958 | Simpson et al. | 29/520 X |
| 3,178,925 | 4/1965 | Oles | 29/522 UX |
| 3,318,169 | 5/1967 | Translien | 308/18 X |
| 3,443,617 | 5/1969 | Whiteside et al. | 29/520 X |
| 3,477,694 | 11/1969 | Milligan | 29/520X |

FOREIGN PATENT DOCUMENTS

| | | | |
|---|---|---|---|
| 970,963 | 11/1958 | Fed. Rep. of Germany | 29/520 |
| 334,019 | 1/1936 | Italy | 29/520 |
| 636,071 | 4/1950 | United Kingdom | 308/236 |

*Primary Examiner*—Charlie T. Moon
*Attorney, Agent, or Firm*—Karl F. Ross

[57] ABSTRACT

A generally cylindrical metallic member of hardened steel, especially a race for a journal bearing, is fitted into or around a supporting element of relatively deformable metal, such as structural steel, having a face perpendicular to the cylinder axis. The hardened metallic member has a peripheral groove into which some of the material of the supporting element is extruded by indenting the perpendicular face, preferably by a circular array of notches.

8 Claims, 6 Drawing Figures

ASSEMBLY OF HARDENED AND DEFORMABLE METAL PARTS

FIELD OF THE INVENTION

Our present invention relates to an assembly for a structural member of hard metal (generally steel), such as a race for a journal bearing, and a supporting element of relatively deformable metal therefor such as a housing or a shaft of unhardened structural steel.

BACKGROUND OF THE INVENTION

In U.S. Pat. No. 3,317,986 there has been disclosed a ball-bearing assembly with a solid outer race member forming a guide groove for the bearing balls and with an inner race member of mild steel or the like initially forming a seat for these balls in the shape of an annular shoulder, the inner member being subsequently deformed by a punch to convert that seat into another guide groove whereby the two race members are positively interconnected through the intervening balls. Owing to its deformability, the inner race member is more susceptible to wear than would be the case if it could be hardened like the outer one; this drawback can be avoided only through local hardening in the region of the guide groove or raceway, which is a cumbersome and expensive procedure.

It is also known to retain a bearing race in position within a surrounding housing or sleeve, of an axial width slightly exceeding that of the race, by indenting opposite faces of that sleeve near its inner peripheral contact surface in order to upset the edges of that contact surface in a radially inward direction with formation of a pair of lips bracketing the bearing race between them. Such a procedure requires a specific geometric relationship between the hardened structural member and its relatively deformable or upsettable supporting element; thus, it cannot be used where the hardened member has a generally cylindrical surface terminating flush with or extending beyond the corresponding contact surface of the supporting element. Furthermore, the axial forces sustainable by the inwardly upset lips are relatively limited; with castings of light metal or steel of a shear strength below 100 kg/mm$^2$, these axial forces in kilograms must not exceed 6D in the case of aluminum and steel or about 3D in the case of magnesium alloys, D being the outer diameter of the bearing measured in millimeters. Reference in this connection may be made to the handbook entitled Wälzlagerungen by W. Hampp, published by Springer in 1968, pages 91 to 94.

OBJECT OF THE INVENTION

The object of our present invention, therefore, is to provide an improved assembly of two components as discussed above, i.e. a hardened structural member with a generally cyjlindrical surface and a relatively deformable supporting element with a complementary surface, which is capable of absorbing larger axial forces, is not subject to the aforementioned geometrical restrictions and does not require special thermal treatments of locally deformable bearing members to increase their wear resistance and hardness.

SUMMARY OF THE INVENTION

We realize this object, in accordance with our present invention, by forming the cylindrical surface of the hardened structural member with a peripheral groove of rectangular cross-section overlain by the complementary surface of the relatively deformable supporting element, this groove being occupied at least in part by metal from the supporting element extruded into it.

The groove may be relatively shallow, with a depth preferably not exceeding 1% of the diameter of the cylindrical surface on which it is formed; its axial width, on the other hand, advantageously measures several times that depth to provide the requisite mechanical strength.

The invention is equally applicable to a housing surrounding an outer race and to a shaft lodged in an inner race of a journal bearing.

BRIEF DESCRIPTION OF THE DRAWING

The above and other features of our present invention will now be described in detail with reference to the accompanying drawing in which.

SPECIFIC DESCRIPTION

Figure 1:
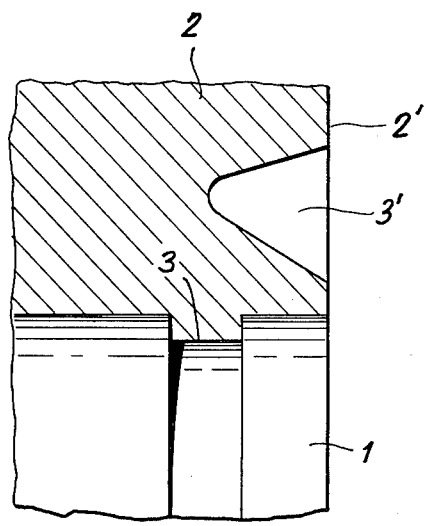
FIG. 1 is a fragmentary axial sectional view of an outer bearing race and a surrounding house embodying our invention.
Figure 2:
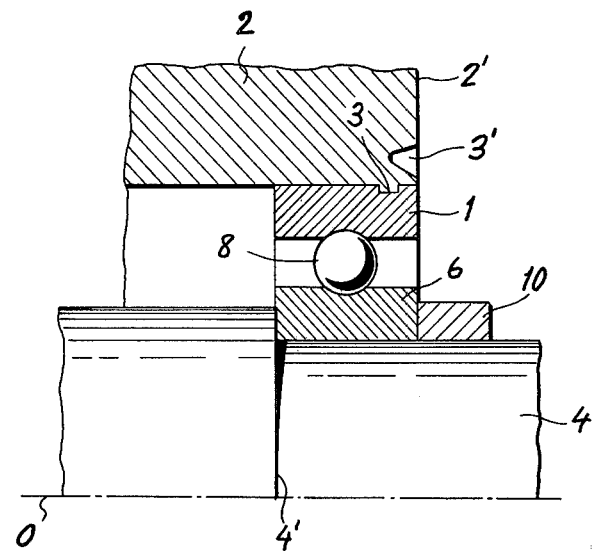
FIG. 2 is a view similar to FIG. 1, drawn to a smaller scale and showing half of the entire bearing together with an associated shaft.

In FIGS. 1 and 2 we have shown a cylindrical member 1 constituting the outer race of a journal bearing which further includes an inner race 6 on a shaft and a set of balls 8 lodged in confronting grooves of the two races, both of which consist of hardened steel. A housing or sleeve 2 surrounding the race 1 is made of light metal or mild steel and has a face 2' perpendicular to the bearing axis 0. Inner race 6 is held in position between a shoulder 4' of shaft 4 and a retaining ring 10 press-fitted, heat-shrunk or otherwise fixedly secured to the shaft.

Figure 5:
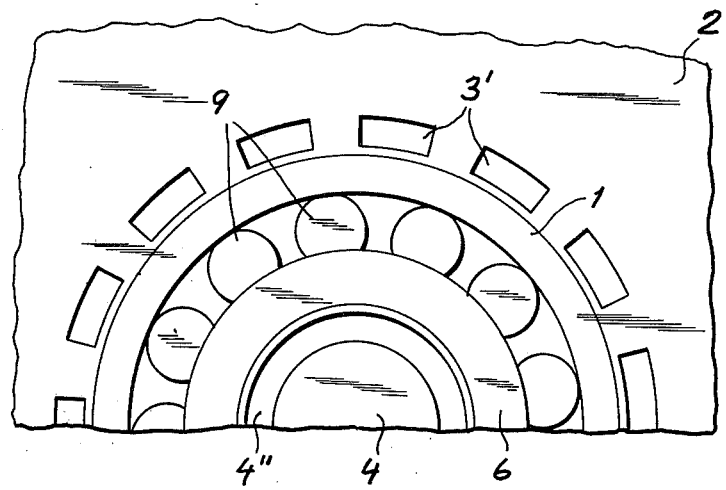
FIG. 5 is a face view of the assembly of FIG. 4.

In accordance with our present invention, the cylindrical outer surface of race 1 is formed with a peripheral groove 3 into which part of the metal of housing 2 is extruded by plastic deformation, i.e. by denting the transverse face 2' of that housing at 3', either along a continuous annular zone or, as shown in FIG. 5, at peripherally spaced locations forming segments of such a zone. The latter technique, resulting in only parts of the groove 3 being coupled by extruded metal of housing 2, requires substantially less energy without significantly reducing the axial forces to be transmitted between components 1 and 2. In either instance, the close contact between race member 1 and housing 2 on both sides of groove 3 prevents the extruded metal of the housing from escaping anywhere but into the groove; in particular, the housing body is not deformed into a radially inward projecting lip at its indented face 2'. Groove 3 is axially spaced from an adjoining peripheral edge of the outer surface of race 1 lying in the plane of face 2'.

Figure 3:
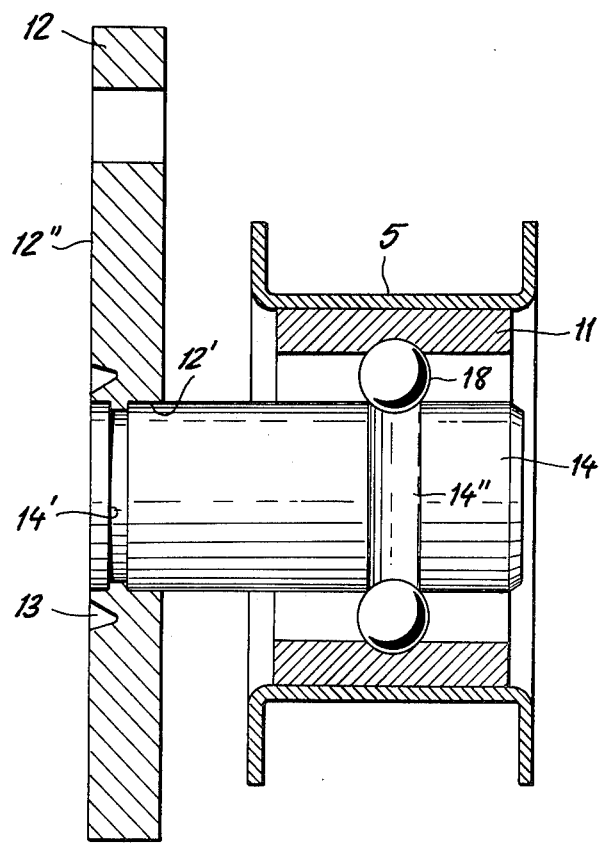
FIG. 3 is an axial sectional view similar to FIG. 2, illustrating a modified assembly.

FIG. 3 shows a housing wall 12 with a bore 12' receiving a nonrotatable stub shaft 14 made from hardened steel, this stub shaft being machined with a guide groove 14" to form the inner race of a journal bearing with balls 18 in that groove supporting an outer race 11 which in turn carries a pulley 5, e.g. as used for a transmission belt of an automotive vehicle. A face 12" of wall 12 is again indented at 13 (either continuously or at peripherally spaced locations) to extrude some of its material into a peripheral mounting groove 14' on the shaft surface.

Figure 4:
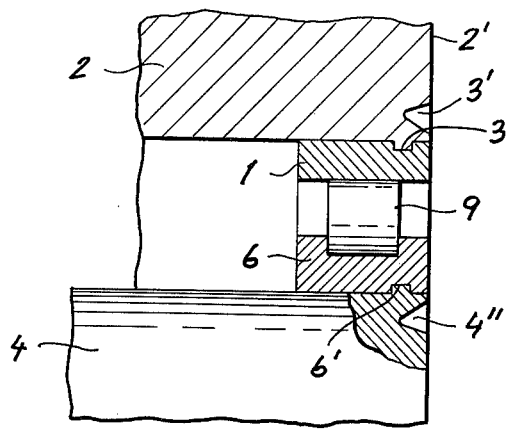
FIG. 4 is a further view similar to FIG. 2, showing another modification.

The assembly of FIGS. 4 and 5 differs from that of FIG. 2 in that the balls 8 have been replaced by rollers 9 which are axially immobilized only with reference to inner race 6, the outer race 1 being free to shift axially with reference thereto within limits determined by other structure not shown. Inner race 6 is here formed with a peripheral groove 6' into which some of the metal of the deformable shaft 4 is extruded by an indentation 4" formed in a transverse face thereof which is flush with the indented face 2' of housing 2 and with the faces of bearing members 1 and 6. Indentation 4" is shown in FIG. 5 to be continuous, in contrast to the segmented indentation 3' of housing 2.

Figure 6:
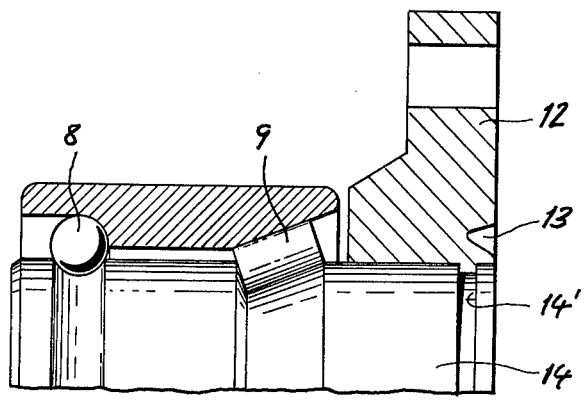
FIG. 6 is still another view similar to FIG. 2, illustrating yet another variant.

The assembly of FIG. 6 is similar to that of FIG. 3, except that the shaft 14 is here shown to carry an outer bearing race through the intermediary of a set of balls 8 and a set of slanting rollers 9.

The spacing of the mounting groove from the indented face of the associated supporting element will be seen to be roughly equal to the axial width of that groove, which may be on the order of a millimeter compared with a groove depth of less than 0.2 mm in the case of a bearing radius of, say, 20 mm. Such a bearing assembly, if formed by upsetting in accordance with the teachings of Hampp (supra), would not sustain axial loads of more than 120 kg. In the present instance, the axial load may be 6,000 kg or more with similar overall dimensions.

With the method of assembly just described, we can use modular and therefore mass-produced bearing members in combination with relatively inexpensive supporting elements that can be readily modified, in accordance with existing requirements, without necessitating any change in the bearing structure proper.

We claim:

1. In a journal bearing including a pair of coaxial annular races of hardened steel separated by a set of rotary bodies, one of said races having a cylindrical surface remote from said bodies, and a supporting element of relatively deformable metal for said one of said races, said supporting element having an annular surface coaxial with said cylindrical surface and in contact therewith, the improvement wherein said one of said races is formed on said cylindrical surface with a peripheral groove of rectangular cross-section overlain by said annular surface, said groove being occupied over at least part of its length and over its entire width by metal from said supporting element extruded into same, the extruded metal transmitting axial forces between said element and said one of said races while preventing any relative axial shifting thereof.

2. The improvement defined in claim 1 wherein said supporting element has a face axially spaced from said groove and generally perpendicular to the axis of said cylindrical and annular surfaces, the extrusion of said metal into said groove being due to an indentation of said face to an axial depth extending into the vicinity of said groove.

3. The improvement defined in claim 2 wherein said indentation is an annular array of notches centered on said axis.

4. The improvement defined in claim 1 wherein said groove has a depth not exceeding 1% of the diameter of said cylindrical surface.

5. The improvement defined in claim 4 wherein said groove has an axial width substantially exceeding said depth.

6. The improvement defined in claim 1 wherein said element is a housing and said one of said races is surrounded by said housing.

7. The improvement defined in claim 1 wherein said element is a shaft, said one of said races surrounding said shaft.

8. The improvement defined in claim 2 wherein said face lies in a plane of a peripheral edge of said cylindrical surface.

* * * * *